United States Patent
Lantz et al.

(10) Patent No.: US 6,277,433 B1
(45) Date of Patent: Aug. 21, 2001

(54) FAT MIXTURES

(75) Inventors: Ingo Lantz, Hamburg; Annette Schroeder, Delmenhorst, both of (DE)

(73) Assignee: Loders Croklaan B.V., Wormerveer-City (NL)

( * ) Notice: Subject to any disclaimer, the term of this patent is extended or adjusted under 35 U.S.C. 154(b) by 0 days.

(21) Appl. No.: 09/531,272

(22) Filed: Mar. 20, 2000

(30) Foreign Application Priority Data

Mar. 19, 1999 (EP) .................................................. 99200868

(51) Int. Cl.[7] ...................................................... A23D 9/00
(52) U.S. Cl. ........................... 426/606; 426/601; 554/227
(58) Field of Search .................... 426/607, 608, 426/606; 554/227

(56) References Cited

U.S. PATENT DOCUMENTS

| | | | |
|---|---|---|---|
| 2,726,158 | * 12/1955 | Cochran et al. | |
| 4,199,611 | * 4/1980 | Toyoshima et al. | 426/607 |
| 4,214,012 | 7/1980 | Ainger et al. | 426/607 |
| 4,234,618 | * 11/1980 | Jasko et al. | 426/607 |
| 4,425,371 | * 1/1984 | Stratmann et al. | 426/603 |
| 4,465,703 | * 8/1984 | Jasko et al. | 426/607 |
| 4,567,056 | * 1/1986 | Schmidt | 426/607 |
| 4,661,343 | * 4/1987 | Zabotto et al. | 424/59 |
| 5,190,868 | 3/1993 | Kokusho et al. | 435/134 |
| 5,858,427 | * 1/1999 | Cain et al. | 426/101 |
| 5,888,575 | * 3/1999 | Lansbergen | 426/610 |

FOREIGN PATENT DOCUMENTS

| | | |
|---|---|---|
| 258452 | * 3/1987 | (DE) . |
| 0 069 599 | 1/1983 | (EP) . |
| 0 245 076 | 11/1987 | (EP) . |
| 0 519 542 A1 | 12/1992 | (EP) . |
| 0 815 738 A1 | 1/1998 | (EP) . |
| 403264518 | * 11/1991 | (JP) . |
| WO96/14755 | * 5/1996 | (WO) . |

OTHER PUBLICATIONS

Bailey's industrial oil & fat products, 5th Ed., vol. 3 (1996) XP002112226.

* cited by examiner

*Primary Examiner*—Carolyn Paden
(74) *Attorney, Agent, or Firm*—Pillsbury Winthrop LLP

(57) ABSTRACT

Randomized fats from triglycerides are disclosed which have a fatty acid composition of: 20–50% C18:0, 30–60% C18:1, 5–15% C16:0 and 0–15% C18:2. The fats display a solid fat content at the temperatures indicated of: N10= 10–30, N20=8–20, N30=5–8 and N35<5.

12 Claims, No Drawings

FAT MIXTURES

BACKGROUND OF THE INVENTION

Natural fats are often fractionated in order to get fractions that have improved properties compared with the unfractionated fats. Examples hereof are fractions of palm oil, shea oil, coconut oil, palm kernel oil and many others. From EP 815 738 blends are known that comprise "an interesterified Shea-olein fraction". However the interesterification conditions are not given and therefore it remains unclear whether this interesterification resulted in randomisation or not. Moreover it remains unclear whether a fraction of an interesterified Sh-olein is applied or whether a fraction of Sh-olein is subjected to interesterification and the product resulting therefrom is used. The blend comprising the product is used for making a whipping cream, respectively a whipped filling fat, although in the text also the use in wrapper margarine is indicated. It is said that by using this fat post-hardening problems of the fat can be reduced. The blends are based on fats with saturated C16 and/or C18 fatty acids in it, such as palm oil or fractions thereof. A disadvantage of the upgrading of a fat by fractionation often is that in addition to the desired fraction with the required product performance also one or more fractions are obtained that are not useful for application in foods. Often these fractions are too liquid, meaning that they have too low solid fat contents if measured by an NMR pulse technique to be able to apply them successfully in foods. These fractions then have to be discarded or have to be used for less useful applications like caddle feed. It would therefore be very beneficial if for such fractions a suitable application could be found, either for the fat as such or after being converted into another fat composition. We therefore studied whether we could find ways to upgrade such (waste) oils. There are actually two different routes of improvement possible:

Route 1 consists of a hardening process which will result in a high trans fatty acid content of the improved product. Route 2 which is part of the invention consists of a randomization process which results in a product having no increase in trans fatty acids. This study resulted in the finding of novel fat compositions with beneficial properties that can be applied in many food compositions. Those novel fats were found to have higher solid fat contents than the fats they were made from. Therefore these novel fats can be used to structure eg liquid oils often used in food compositions like margarines (puff pastry or cream) or icings, while they are also very useful as frying oil either as pure fat or as a blend with one or more other fats or oils.

An example of an attempt to reuse a liquid oil is disclosed in EP 69599. According to this patent a CBE is made from shea oil by fractionation. The olein fraction formed as side product is up-graded by subjecting it to a directed 1,3 enzymic interesterification. By this process the fatty acid groups bonded to the 1,3 positions of the triglycerides are redistributed and some more of the SOS compound is formed. This is isolated by fractionation. Still an olein fraction is obtained as side product for which no use exists.

SUMMARY OF THE INVENTION

Thus our invention concerns in the first instance a fat composition having a triglyceride composition, corresponding with a randomized, interesterified fat having a fatty acid composition of:

20–50 wt % C18:0
30–60 wt % C18:1
5–15 wt % C16:0 and
0–15 wt % C18:2

Our process leads to a different triglyceride composition than obtained by the process according to EP 69599, because in that process only the fatty acids in the 1 and 3 positions are interexchanged, whereas in our process all fatty acid groups present in the fat participate in the interesterification.

DETAILED DESCRIPTION OF THE INVENTION

Preferred fat compositions are fat compositions, wherein the composition comprises 4 to 10 wt % of SSS
5 to 15 wt % of SUS
10 to 20 wt % of SSU
15 to 30 wt % of SUU
8 to 20 wt % of USU
12 to 30 wt % of UUU-triglycerides
preferably 4–8 wt % S3, 18–32 wt % S2U, 35–48 wt % SU2, 14–20 wt % U3

(S=saturated fatty acid with 16–18 C-atoms and U=unsaturated fatty acid with 18 C-atoms) and which preferred fat compositions display a fatty acid composition (by FAME) of:

20–50 wt % C18:0, preferably 25–35 wt %
30–60 wt % C18:1, preferably 45–56 wt %
5–15 wt % C16:0, preferably 6–10 wt %
0–15 wt % C18:2, preferably 5–10 wt %, while the composition displays a solid fat content at the temperature indicated of:

N10=10–30
N20=8–20
N30=5–8
N35<5.

A particularly preferred fat is a fat that is obtained as a randomised, interesterified Shea oil olein. Shea oil olein is obtained as a side stream during the production of Shea oil stearin (a well known cocoa butter equivalent) from Shea oil. However sofar no useful application of Shea oil olein was known, without an increase of trans fatty acids.

The fat according to the invention can be applied as such, however it is also possible to use blends of this fat with other fats or oils. In that instance the novel fats can act as structuring fat for the other fats. Therefore the invention also concerns blends of triglycerides, comprising 10 to 90 wt % of a fat composition according to claims 1–3 and 10 to 90 wt % of another fat, preferably selected from the group consisting of liquid oils (sunflower oil, rape seed oil, soybean oil, arachidic oil), tropical oils (coconut oil, palm kernel oil, palm oil), fractions thereof, or fully or partially hydrogenated products or interesterified mixes of them. In particular the use of the hard or fully hardened vegetable fat (fractions) leads to good results.

Preferred examples of other fats are fats that are liquid at ambient temperature (i.e having an N20<5, such as sunflower oil, soybean oil, olive oil etc.) and or having relatively high contents of C12/C14 fatty acid residues (such as coconut oil; or palm kernel fat) and/or having substantial amounts of C22 or higher fatty acid residues in it (such as arachidic oils or rape oils).

Another main advantage of our novel fats is that they are derived from natural fats and that thus the products obtained after interesterification are about free of trans fatty acids. Trans fatty acids are considered less healthy nowadays and thus our novel fats can be considered as healthier than the fats with a relatively high trans content. Our invention therefore is also directed to fat compositions, wherein the composition has a trans fatty acid content of less than 10 wt %, preferably less than 5 wt %, most preferably less than 2 wt %. Trans content being defined here as the total of the trans fatty acids over the total number of unsaturated bonds in the unsaturated fatty acids present.

Very beneficial applications of our novel fats or of blends containing them are the use of these fats or blends in icings, resulting in increased plasticity and decreased trans fatty acids compared to common icings. Icing compositions comprising
30–70 wt % of a fat
0–30 wt % of powder products or mass (i.e. SMP, fruit, cacao etc.)
10–60 wt % of one or more sugars or sugar alkohols or mixtures of them
0.1–3 wt % of an emulsifier, wherein the fat comprises 10–100% of the fat according to claims 1–3.

Our fats can also be used successfully in margarine compositions, in particular in puff pastry margarines and in cream margarines. By using our fats or our blends puff pastry margarines can be made comprising a fat emulsion with a fat content of 40–90 wt %, while the total emulsion displays a Stevens hardness C at 20 oC of 1000 to 4000 g. Cream margarines can be made comprising a fat emulsion with a fat content of 40–90 wt % wherein the fat is a fat or a fat blend according the invention while the emulsion displays a Stevens hardness C at 20 oC of 400 to 1500 g. Stevens hardness being measured using a Stevens Texture analyzer with a probe of 12 mm and using a penetration speed of 1 mm/s and a penetration depth of 10 mm.

The fats or fat blends according to the invention can also be used for the preparation of shortenings or frying fats. Hereto some silicon additive and/or emulsifier can be incorporated into the fat or fat blend. Any known silicon additive or emulsifier can be applied, although we prefer to use types of siloxanes and/or all kinds of lecithines and/or mono-diglyceride mixes. Therefore in another embodiment our invention also concerns with a shortening or a frying fat composition comprising 10 to 100 wt % of fat and at least one of: (i) silicon additives and (ii) emulsifier such that the total of (i)+(ii)>0% and flavours in amounts of 0–1 wt % of silicon additives and/or 0–2 wt % of emulsifier and/or 0–2 wt % of flavour, wherein the fat is a fat or fat blend according the invention.

Our novel fats can be obtained by the following process a natural vegetable fat or a blend of natural fats is selected with a FAME of:
20–50 wt % of C18:0
30–60 wt % of C18:1
5–15 wt % of C16:0 and
0–15 wt % of C18:2
which fat is subjected to a randomisation using a base as catalyst
whereupon a randomised fat is isolated from the reaction mix after washing.

According to a last embodiment our invention concerns also the use of a fat composition with the composition according to the invention, wherein the composition is applied as a frying fat.

It should be noted that the N-values indicated in this application were measured on fats that were subjected to the following T-regime:
melt fat at 80 oC; adjust temperature to 60 oC; cool fat until 0 oC and keep fat at 0 oC for 60 min, heat fat to measurement temperature and keep it at this temperature for 30 min and measure N-value at the temperature indicated.

EXAMPLES

Example 1

Preparation of in SH-f from Shf:

Shea olein was neutralized and dried before interesterification (FFA after treatment less then 0,05%, moisture less then 0,07%). Interesterification was devided into different steps:

heating of the raw material up to 110° C. under vacuum condition
adding 0,2% of sodiummethylate (catalyst). Temperature was kept constant for 15 minutes under stirring conditions.
During this time interesterification took place.
cooling to 95° C.
soap deposit by adding water
drying under vacuum
bleaching and deodorisation under standard conditions Overall fame analysis on triglycerids of randomized Shea olein was carried out on triglyceride recovered from an aluminia column, following the standard operating procedures.

| FAME | OVERALL |
|---|---|
| C 12:0 | 0,4 |
| C 14:0 | 0,2 |
| C 16:0 | 7,8 |
| C 16:1 | 0,1 |
| C 18:0 | 28,1 |
| C 18:1 | 53,2 |
| C 18:2 | 7,9 |
| C 18:3 | 0,2 |
| C 20:0 | 1,1 |
| C 20:1 | 0,5 |
| C 22:0 | 0,1 |

Solids content of SH-f and inSHf:

| SOLIDS: | N10 | N20 | N30 | N35 |
|---|---|---|---|---|
| SHf | 1,2 | 0,7 | 0,5 | 0,1 |
| inSHf | 15,9 | 9,6 | 5,4 | 3,5 |

| Triglyceride distribution | SHf | inSHf |
|---|---|---|
| SSS | 1,5 | 5,6 |
| SOS | 19,5 | 7,8 |
| SSO | 2,6 | 15,7 |
| SLnS | 4,7 | 1,1 |
| SSLn | 0,2 | 2,3 |
| OSO | 1,2 | 11 |
| SOO | 34,6 | 22 |
| SOLn | 11,7 | 9,7 |
| OOO | 15,3 | 15,5 |
| Rest | 8,7 | 9,3 |

Example 2

Preparation of Blends Comprising inSHf:

Fully refined and randomized sheaolein was blended with fully refined other fat components in the following ratio (wt %):

| Blend | palm oil | palm-stearine mp 52 | partly hardened palm-oil, mp 42 | LE-rape seed oil | partly hardened LE-rapeseed oil, mp 30 | randomized shea olein | coconut oil | palm-kernel oil |
|---|---|---|---|---|---|---|---|---|
| 1 |  | 5 | 45 | 10 |  | 40 |  |  |
| 2 |  | 60 |  | 15 |  | 25 |  |  |
| 3 | 30 | 8 | 36 | 13 |  | 13 |  |  |
| 4 |  |  |  |  | 100 |  |  |  |
| 5 |  |  |  |  |  |  | 100 |  |
| 6 |  |  |  |  | 90 | 10 |  |  |
| 7 |  |  |  |  |  | 10 |  | 90 |
| 8 |  |  |  |  |  | 10 | 90 |  |
| 9 | 60 | 10 |  |  |  | 30 |  |  |
| 10 | 100 |  |  |  |  |  |  |  |

These blends were used for the applications, mentioned in examples 3–6.

Example 3
Application of Fat-blends in Puff Pastry 3.1: Preparation of Puff Pastry Fat

| FAME | Blend 1 | Blend 2 |
|---|---|---|
| C 12:0 | 1,4 | 0,9 |
| C 14:0 | 1,0 | 1,1 |
| C 16:0 | 26,0 | 38,9 |
| C 16:1 | 0,2 | 0,2 |
| C 18:0 | 16,8 | 8,9 |
| C 18:1 | 45,4 | 38,1 |
| C 18:2 | 6,1 | 8,5 |
| C 18:3 | 1,2 | 1,5 |
| C 20:0 | 0,6 | 0,5 |
| C 20:1 | 0,4 | 0,3 |
| C 22:0 | 0,1 | 0,1 |
| Trans-Fatty Acid (%) | 6,6 | virtually free |
| Solid content 20° C. (N20) | 38,0 | 39,0 |
| Solid content 30° C. (N30) | 20,8 | 23,8 |
| Solid content 35° C. (N35) | 13,9 | 17,4 |
| Iodine Value | 71,1 | 65,6 |

The N-values were measured by means of NMR (one hour stabilisation).

From the fat blends 1 and 2 a puff pastry margarine was manufactured. The margarine had the following composition (wt % on total composition):
Fat phase: 82%
81,5% fat
0,2% Lecithine Adlec
0,3% Mono-Di-glyceride Admul4203
trace beta-Carotine and flavour
Water phase: 18%
17,4 water
0,4% whey powder
0,2% citric acid The margarine was processed at laboratory scale through a conventional A-A-B sequence with a throughput of 95 1/hr., an exit temperature on the first A-unit (260 rpm) of 21° C., an exit temperature on the second A-unit (270 rpm) of 18° C. and a packaging temperature of 24° C. Line pressure was 30 bar. The margarine was stored at 20° C.

Unexpexted good puff pastry fats resulted, which had good plasticity to make them suitable for a lamination fat.

The products exhibited the following "Stevens" values after 1 week (12 mm probe, texture analyzer): Fat with blend 1: 3213 g, fat with blend 2:2845 g.

3.2. Preparation of Puff Pastries:

The resulting puff pastry margarine were used for preparing pastries according to the following method:

Dough composition (total weight in grams):

| | |
|---|---|
| Flour | 1000 |
| Salt | 15 |
| Sugar | 30 |
| Water | 600 |
| Puff Pastry Fat | 1000 |

Dough was kneaded for 3,5 minutes and rested for 10 minutes before lamination. Dough temperature 20° C. Lamination was done in a two step procedure where after the first lamination a 10 minutes resting time was used and after the second lamination a resting time of 1 hour. From this laminated dough pastries of 35 grams were formed and baked in a conventional baking oven (Debag) for 28 minutes at 190° C. (75% rel.moisture).

The products exhibited beneficial and advantageous results in:
general impression
turn-over
patty height (Blend 1:3,9 cm, Blend 2:4,1 cm)

Example 4
Application of a Fat Blend in Baking Creams 4.1: Preparation of a Cream Baking Fat

| FAME | Blend 3 |
|---|---|
| C 12:0 | 0,6 |
| C 14:0 | 0,9 |
| C 16:0 | 35,4 |
| C 16:1 | 0,4 |
| C 18:0 | 9,8 |
| C 18:1 | 43,1 |
| C 18:2 | 7,1 |
| C 18:3 | 1,1 |
| C 20:0 | 0,4 |
| C 20:1 | 0,3 |
| C 22:0 | 0,1 |
| Trans-Fatty Acid (%) | 5,8 |
| Solid content 20° C. (N20) | 36,7 |

-continued

| FAME | Blend 3 |
|---|---|
| Solid content 30° C. (N30) | 18,9 |
| Solid content 35° C. (N35) | 11,8 |
| Iodine Value | 51,8 |

The N-values were measured by means of NMR (one hour stabilisation).

From this fat blend a baking cream was manufactured. The cream had the following composition (wt % on total composition):

40,0% Fat
35,3% Sugar
20,0% Water
4,0% Mono-Di-glyceride Admul 4204
0,5% Salt
0,2% Tartaric acid
traces of colouring agents and flavours The baking cream was processed at laboratory scale through a conventional A-A-B sequence with a throughput of 85 l/hr., an exit temperature on the first A-unit (230 rpm) of 22° C., an exit temperature on the second A-unit (270 rpm) of 20° C. and a packaging temperature of 23° C. Line pressure was 30 bar. The baking cream was stored at 20° C.

The baking cream obtained had good properties to make them suitable for baking application.

The product exhibited a "Stevens" values after 1 week (12 mm probe, texture analyzer) of 1638 g.

4.2.: Preparation of Pan-baked White Bread:

The baking cream was also used for preparing a Pan-baked white bread according to the following method:

Dough composition (total weight in grams):

| | |
|---|---|
| Flour | 3000 |
| Salt | 45 |
| Yeast | 240 |
| Water | 1500 |
| Cream | 720 |

Dough was kneaded in a spiral mixer for 8 minutes (1 min. slow, 7 min. fast) and rested for 30 minutes (two times a rough folding after 15 minutes each). Dough temperature was 26,1° C. Proving was done for 5 minutes at 36° C. before folding procedure and for another 45 minutes after the folding procedure. Folding procedure was only used to get the right shape of the dough by using a lamination machine. Pan-baked white bread was baked in a conventional baking oven for 35 minutes at 210° C. (75% rel. moisture).

The baked product had an excellent general impression, especially the good volume (1900 g/l) and the improved elasticity of the crumb is advantageous for this kind of products.

Example 5

Application of Fat-blends in Icings/Glazers/Coatings 5.1: Preparation of Icings/Glazers/Coatings

| FAME | Blend 4 | Blend 5 | Blend 6 | Blend 7 | Blend 8 |
|---|---|---|---|---|---|
| C 12:0 | 0,1 | 45,9 | 0,1 | 47,6 | 41,3 |
| C 14:0 | 0,1 | 17,2 | 0,1 | 16,0 | 15,5 |
| C 16:0 | 5,1 | 9,11 | 5,3 | 8,2 | 8,1 |
| C 16:1 | 0,1 | 0,1 | 0,1 | 0,1 | 0,1 |
| C 18:0 | 6,0 | 2,7 | 8,2 | 5,0 | 5,2 |
| C 18:1 | 77,2 | 7,6 | 74,8 | 18,8 | 12,2 |
| C 18:2 | 5,9 | 2,2 | 6,1 | 2,7 | 2,8 |
| C 18:3 | 0,3 | 0,1 | 0,3 | 0,1 | 0,1 |
| C 20:0 | 0,7 | 0,1 | 0,8 | 0,2 | 0,2 |
| C 20:1 | 0,2 | 0,1 | 0,3 | 0,1 | 0,1 |
| C 22:0 | 0,4 | 0,1 | 0,4 | 0,1 | 0,1 |
| Trans-Fatty Acid (%) | 57 | virtually free | 51,4 | virtually free | virtually free |
| Solid content 20° C. (N20) | 44,1 | 34,2 | 40,0 | 33,6 | 23,1 |
| Solid content 30° C. (N30) | 5,2 | 0,3 | 5,8 | 0,2 | 0,4 |
| Solid content 35° C. (N35) | 0,1 | 0,1 | 1,0 | 0 | 0 |

The N-values were measured by means of NMR (one hour stabilisation).

From these fat blends icings were manufactured with following composition (wt %):

57% icing sugar
40% fat
2,5% skim milk powder
0,5% lecithine Bolec Z
traces of colouring agents and flavours The icings were processed on a Fryma mill (angular space 0,3 mm) at 45° C. After crystallization at 10° C. for 24 hours, the samples were stored at 20° C.

5.2: Assessment of Icings/Glazers/Coatings

The icings were analyzed concerning hardness (force) and flexibility (distance) on a texture analyzer (Stable Micro Systems). For preparation the icing was melted at 40° C., formed into a small bar (volume 10 cm$^{-3}$) and stored at minus 20° C.

Analysis of the physical properties of icings (average value of 5 measurements/5 bars):

| | Blend 4 | Blend 5 | Blend 6 | Blend 7 | Blend 8 |
|---|---|---|---|---|---|
| Force (g) | 2500 | 2500 | 2400 | 3500 | 3700 |
| Distance (mm) | 0,55 | 0,65 | 0,7 | 0,55 | 0,45 |

The results show that the product properties concerning flexibility and hardness can be modified by using randomized shea olein (compare blends 4 and 6; respectively blends 5 and 8). Especially the application of the randomized shea olein in a blend for icings in the ice-cream industry is advantageous because of the good flexibility at minus 20° C.

Example 6
Application of Fat-blends as Frying Fat
6.1: Preparation of Frying Fat

| FAME | Blend 9 | Blend 10 |
|---|---|---|
| C 12:0 | 1,1 | 0,2 |
| C 14:0 | 1,0 | 1,0 |
| C 16:0 | 36,8 | 44,2 |
| C 16:1 | 0,2 | 0,2 |
| C 18:0 | 8,3 | 4,3 |
| C 18:1 | 42,6 | 39,1 |
| C 18:2 | 8,5 | 9,9 |
| C 18:3 | 0,3 | 0,2 |
| C 20:0 | 0,5 | 0,4 |
| C 20:1 | 0,2 | 0,1 |
| C 22:0 | 0,1 | 0,1 |
| Trans-Fatty Acid (%) | virtually free | virtually free |

The components of the fat blends were mixed and used for frying analysis 6.2.: Assessment of Frying Fats The fats (each 13,5 kg) were filled in a frying pan and every 2 hours 1 kg of raw French fries were added and fried at 180° C. This was done 4 times a day for 6 days in total. Samples of the fats were analysed in laboratory.

|  | Blend 9 | Blend 10 |
|---|---|---|
| Start (0 hr): Free Fatty Acid (%) | 0,05 | 0,04 |
| Start (0 hr): Colour Lovibond Red | 2,5 | 2,3 |
| Start (0 hr): Colour Lovibond Yellow | 26,0 | 25,0 |
| Start (0 hr): Smoke point (° C.) | 224 | 228 |
| Start (0 hr): apolar parts (%) | 90,7 | 91,8 |
| 24 hr: Free Fatty Acid (%) | 0,29 | 0,31 |
| 24 hr: Colour Lovibond Red | 4,3 | 2,7 |
| 24 hr: Colour Lovibond Yellow | 58,0 | 35,0 |
| 24 hr: Smoke point (° C.) | 192 | 172 |
| 24 hr: apolar parts (%) | 78,5 | 74,7 |
| 48 hr: Free Fatty Acid (%) | 0,70 | 0,72 |
| 48 hr: Colour Lovibond Red | n.d. | 6,2 |
| 48 hr: Colour Lovibond Yellow | n.d. | >70 |
| 48 hr: Smoke point (° C.) | 188 | 168 |
| 48 hr: apolar parts (%) | 67,5 | 64,0 |

Results show that by using randomized shea olein (=blend 9) the frying properties can be improved. Especially the chemical decomposition and polymerisation of the fat components is lowered compared to a standard frying fat (blend 10) resulting in a better smoke point.

Although from a chemical point of view the use of randomized shea olein is advantageous, the change in colour is different compared to the standard frying fat. Nevertheless the fried product (French fries) did not have any off-taste or colouring defect.

What is claimed is:

1. Fat composition having a triglyceride composition, corresponding with a randomized, interesterified fat having a fatty acid composition of:
   20–50 wt % C18:0
   30–60 wt % C18:1
   5–15 wt % C16:0 and
   0–15 wt % C18:2,
said fat composition being further characterized as comprising:
   4 to 10 wt % of SSS
   5 to 15 wt % of SUS
   10 to 20 wt % of SSU
   15 to 30 wt % of SUU
   8 to 20 wt % of USU and
   12 to 30 wt % of UUU-triglycerides wherein
S=saturated fatty acid with 16–18 C-atoms and U=unsaturated fatty acid with 18 C-atoms, said fat composition displaying
a solid fat content at the temperature indicated of:
   N10=10–30
   N20=8–20
   N30=5–8
   N35<5.

2. Fat composition according to claim 1, wherein the composition is randomized, interestertified Shea olein.

3. Blend of triglycerides comprising 10 to 90 wt % of a fat composition according to claim 1 and 10 to 90 wt % of another fat selected from the group consisting of sunflower oil, rape seed oil, soybean oil, arachidic oil coconut oil, palm kernel oil, palm oil, fractions thereof, or fully or partially hydrogenated products or interesterified mixes of them.

4. Fat composition according to claim 1 or 3, wherein the composition has a trans fatty acid content of less than 10 wt %.

5. Puff pastry margarine comprising a fat emulsion with a fat content of 40–90 wt %, wherein the fat is a fat or a fat blend according to claim 1 or 3, while the total emulsion displays a Stevens hardness C at 20° C. of 1000 to 4000 g.

6. Cream margarine, comprising a fat emulsion with a fat content of 40–90 wt % wherein the fat is a fat or a fat blend according to claims 1 or 3 while the emulsion displays a Stevens hardness C at 20° C. of 400 to 1500 g.

7. Shortening and frying fat composition comprising 10 to 100 wt % of fat and at least one of silicon additives and emulsifier in amounts of 0–1 wt % of silicon additives and 0–2 wt % of emulsifier, wherein the fat is a fat or fat blend according to claims 1 or 3.

8. Icing composition comprising:
   30–70 wt % of a fat,
   0–30 wt % of powder products or mass
   10–60 wt % of one or more sugars or sugar alcohols or mixtures thereof
   0.1–3 wt % of an emulsifier, wherein the fat comprises
   10–100% of the fat according to claim 1.

9. Process for the preparation of a fat which comprises selecting
a natural vegetable fat or a blend of natural fats with a FAME of:
   20–50 wt % of C18:0
   30–60 wt % of C18:1
   5–15 wt % of C16:0 and
   0–15 wt % of C18:2,
subjecting said fat to a randomisation using a base as catalyst and isolating
a randomised fat from the resulting reaction mix after washing to prepare the composition according to claim 2.

10. A fat composition according to claim 1 wherein the composition comprises

4–8 wt % SSS, 18–32 wt % SSU,
35–48 wt % SUU and
14–20 wt % UUU.

11. A fat composition according to claim 1 having a fatty acid composition of:
25–35 wt % C18:0
45–56 wt % C18:1
6–10 wt % C16:0
5–10 wt % C18:2.

12. Puff pastry margarine comprising a fat emulsion with a fat content of 40–90 wt % wherein the fat is a fat or a fat blend having a triglyceride composition corresponding with a randomized, interestified fat having a fatty acid composition of:
20–50 wt % C18:0
30–60 wt % C18:1
5–15 wt % C16:0
0–15 wt % C18:2
and the total emulsion displays a Stevens hardness C at 20° C. of 1000 to 4000 g.

* * * * *